United States Patent [19]

Meiser et al.

[11] Patent Number: 5,408,154

[45] Date of Patent: Apr. 18, 1995

[54] MOTOR CONNECTION BLOCK, PARTICULARLY FOR ELECTRIC MOTORS

[75] Inventors: Karl-Heinz Meiser; Martin Huber, both of Bruchsal, Germany

[73] Assignee: Sew-Eurodrive GmbH & Co., Bruchsal, Germany

[21] Appl. No.: 58,765

[22] Filed: May 10, 1993

[30] Foreign Application Priority Data

May 15, 1992 [DE] Germany .................. 42 16 036.7

[51] Int. Cl.[6] .......................................... H02K 11/00
[52] U.S. Cl. .................... 310/71; 174/50.52; 310/89; 439/577
[58] Field of Search ............... 310/43, 71, 85, 89, 310/42; 174/50, 50.52, 52.1, 59, 60, 17.08, 17 R, 18; 439/90, 213, 222, 577

[56] References Cited

U.S. PATENT DOCUMENTS

| | | |
|---|---|---|
| 2,922,054 | 1/1960 | Miller ................................ 310/71 |
| 3,518,616 | 6/1970 | Lewis ................................ 339/107 |
| 3,983,428 | 9/1976 | Bitsch et al. ...................... 310/68 R |
| 4,198,583 | 4/1980 | Anderson et al. ................. 310/71 |
| 4,748,355 | 5/1988 | Anderson et al. ................. 310/71 |
| 4,781,610 | 11/1988 | Mercer ............................. 439/217 |
| 4,880,391 | 11/1989 | Hurtgen ........................... 439/221 |
| 5,063,317 | 11/1991 | Bruhn .............................. 310/91 |
| 5,140,207 | 8/1992 | Baumeister et al. ............. 310/83 |

Primary Examiner—Steven L. Stephan
Assistant Examiner—D. R. Haszko
Attorney, Agent, or Firm—Antonelli, Terry, Stout & Kraus

[57] ABSTRACT

A motor connection block of the aforementioned type wherein a plug insert is constructionally integrated in a motor terminal box and the socket insert is so constructionally arranged in a terminal box cover that the motor terminal box functionally forms a plug casing and the terminal box cover functionally forms a casing for the socket part and serves as a carrier for one or more cable screw joints.

8 Claims, 7 Drawing Sheets

MOTOR CONNECTION BLOCK, PARTICULARLY FOR ELECTRIC MOTORS

The invention relates to a motor connection or terminal block with a plug and a socket insert.

Such a motor connection block is known from DE-A-39 34 981. The motor connection block comprises an electrically insulating carrier in the form of a casing, in which are constructed insertion slots for cable strands, and in the casing are provided series terminal-like juxtaposed connecting bodies, in each case two thereof positioned on opposite sides of the casing being electrically interconnected. The cable strands can be fixed by screw terminals in the connecting bodies. It is a disadvantage of this motor connection block construction that the connection and the wiring can only take place by releasing the electrical lines and separating the motor circuit.

Plug connector combinations are also known, which in each case comprise an upper part and a lower part with in each case an individual protective casing, whose lower parts can be firmly screwed to the motor casing, so that a separation of the motor from its connecting lines can take place rapidly and simply.

In such plug connector combinations the insertion slots for the cable strands are located on the side of the plug or the socket insert opposite to the plug contacts. Between these and the casing bottom there is generally a free space for laying the cable strands.

It is disadvantageous in this construction that the space requirement is considerable and results from the fitting of such plug connector combinations, together with the exposed arrangement thereof to harmful external mechanical force actions.

The problem of the invention is, whilst avoiding the aforementioned disadvantages, to provide a motor connection block, which permits a separation of the motor from its connecting lines and optionally further electrical elements connected to the motor from the power supply or switching elements in a simple and reliable manner, whilst obviating faulty wiring, without any detachment of electrical screw contacts, whilst in the case of a minimum space requirement, there is also a minimum area of exposure to external force action and consequently maximum robustness can be achieved.

According to the invention this problem is solved in the case of a motor connection block in that the latter has a plug and a socket insert, the plug insert being constructionally integrated into the motor terminal box and the socket insert is located in the terminal box cover. The motor terminal block simultaneously fulfils the function of the plug casing. The terminal box cover fulfils the function of the socket casing. The terminal box cover is preferably constructed in such a way that it receives one or more cable screw joints.

It is advantageous for the terminal box cover to be square, so that it can be fitted to the motor terminal box in four positions displaced by in each case 90° and the connecting cables can correspondingly be led away from the motor in four different directions.

According to a preferred development, the setscrews are oriented parallel to the plug contacts. According to an extremely advantageous further development, the insertion slots for the cable strands are oriented parallel to one another and in the same direction from in each case interconnectable clamps. As a result of this construction cable strands which belong together, e.g. on the one hand cable strands from the mains and on the other cable strands leading to the motor and to be electrically connected thereto, can be inserted from one side into the motor connection or terminal block, so that the risk of incorrect wiring is significantly reduced.

A further preferred development provides for two rows of pairwise interconnectable clamps. Thus, in a small space and therefore in a small casing it is possible to bring about a large number of electrical connections. To ensure that the lower and upper parts of the motor connection block cannot be incorrectly assembled, according to a preferred development, the lower and upper parts are given a complimentary, but asymmetrical construction.

According to another preferred development, two diemetrically arranged contacts are shortened and supplied to a circuit, whose interruption leads to the disconnection of the complete motor power supply. This ensures that on pulling out the plug the power supply to the motor is interrupted and the plug contacts can be separated in load-free manner.

Electrical safety is further increased and in particular creepage currents are eliminated if, according to a further development, the live parts and in particular the plug contacts and setscrews are surrounded by plastic profiles.

To ensure that in the case of plug connector engagement that an earthing connection is produced, according to a preferred further development there are earth bars parallel to the plug contacts in the associated part and that the length of the earth bars is greater than that of the plug contacts. In addition, the earth bars are electrically conductively connected to fastening screws of the two parts. Thus, the fixing of the lower and upper parts to the motor or its stator or a stator plate or terminal box cover, there is simultaneously an earthing of the two elements.

The invention makes it possible to integrate a motor connection block according to the invention in a motor terminal box in such a way that one part of the terminal box, such as the plug insert, is firmly fixed to the motor or its stator casing or to a stator flange constructed thereon or to an intermediate plate connected thereto, whereas the other part, namely the socket insert, in four positions displaced by in each case 90°, is firmly arranged in the terminal box cover. The electric power supply to the motor is provided via the terminal box cover and the socket insert, whereas the individual motor windings are connected to the plug insert. In the sane way on the socket insert are provided electronic devices, such as rectifiers, semiconductor switches for the rapid disconnection of motor brakes, etc., whilst the corresponding elements are wired by means of the plug insert. The electrical connection is only brought about after closing the motor terminal box, whereas the electrical separation takes place by opening said box. This permits a rapid, simple and safe replacement of motors or electronic elements in the terminal box cover.

The connection of the motor with a star (Y) or delta circuit can take place in simple manner by correspondingly constructed terminal bridges, which can optionally be constructed as interchangeable terminal bridges and which on the motor side are fixed with the corresponding strands in the clamp.

As a result of the invention the wiring or connection functions on the one hand and the detachable plugging in a single component, namely the motor connection block according to the invention, are combined, so that it is possible to reduce the size of the motor terminal box. However, with a limited overall height there is an identical good accessibility to the line connections, in that plug-in screws parallel to the plug connectors are accessible with the motor connection block open. This is achieved in that the pins and bushes necessary for a plug connection are directly integrated into the clamp. They are designed in such a way that the desired motor connections can take place by simply turning or reversing the interchangeable terminal bridge. The motor connection block provides the necessary air and creepage paths from live parts in accordance with the appropriate regulations, because all the live parts, such as the aforementioned plastic profiles are covered, so that accidental contact is rendered impossible.

The invention is described in greater detail hereinafter relative to nonlimitative embodiments of a motor connection or terminal block according to the invention with reference to the attached drawings, wherein show.

Figure 1:
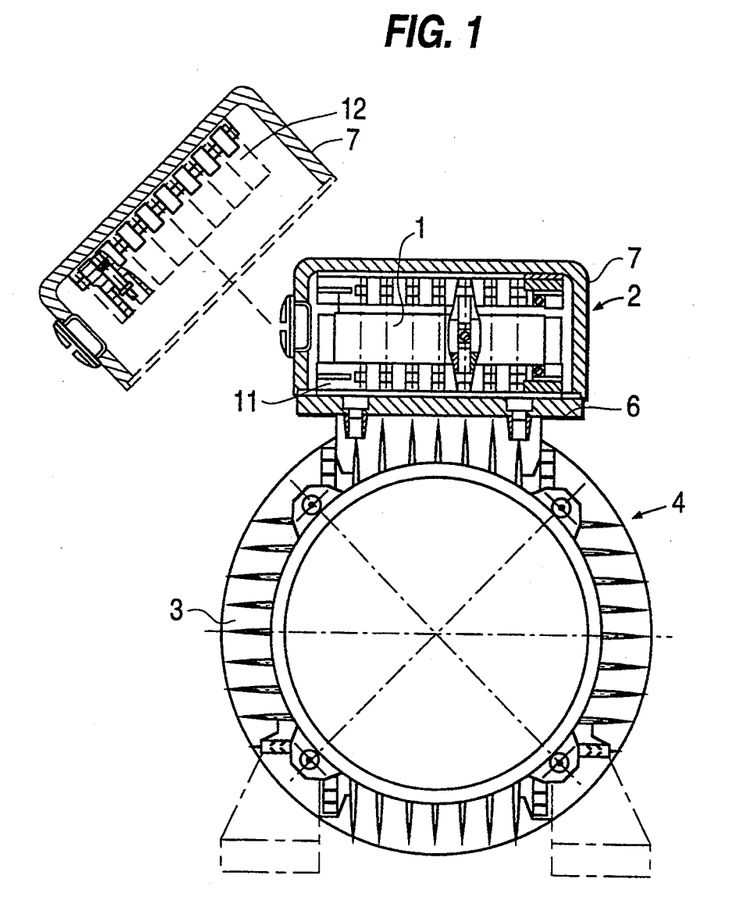
FIG. 1 The arrangement of a motor connection block according to the invention on a motor.

The motor connection or terminal block 1 according to the invention is normally housed in a motor terminal-box 2, which is conventionally fixed to a stator casing 3 of an electric motor 4 or is a component thereof. The motor terminal box 2 comprises an intermediate plate or a stator flange 6 as the lower part and which is fixed (e.g. by means of screws) to the stator casing 3, and a terminal box cover 7, which is mounted on the intermediate plate or the stator flange 6 or can be released therefrom. Apart from the motor connection block the motor terminal box may also house further control elements for the electric motor 4 or an electromagnetic brake associated therewith, such as e.g. a rectifier 8 for the brake motor, said elements optionally also being wired via the motor connection block.

Figure 2:
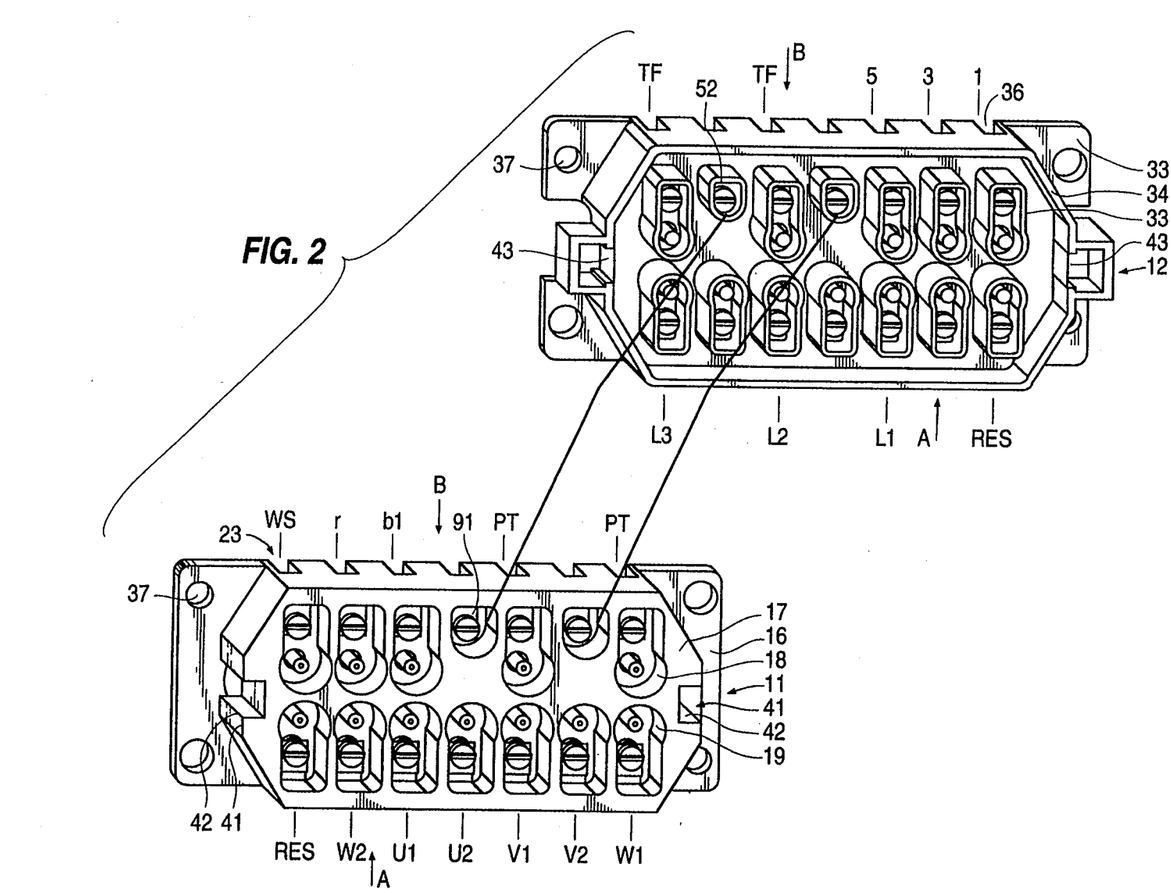
FIG. 2 In perspective form a motor connection block according to the invention in the opened state.

The motor connection block 1 comprises two parts, namely a plug insert 11 and a socket insert 12. The plug insert 11 is fixed to the intermediate plate or the stator flange 6 and therefore the motor, whereas the socket insert 12 is fixed to the terminal box cover 7. By closing the motor terminal box 2 (by engaging the terminal box cover 7 on the plate or the flange 6) automatically the subsequently described plug contacts are formed between the plug and the socket insert of the motor connection block.

The plug insert 11 has a fastening plate 16 to which is connected in one piece the clamp block 17. The clamp block 17 contains recesses 18 in which are located the clamps 19. The clamps 19 have a clamp sleeve or collet 21 for the cable strands, whose cavity 22 is accessible by means of lateral insertion slots 23 in the plug insert 11 for inserting cable strands in the direction of the arrows A or B.

Figure 3A:
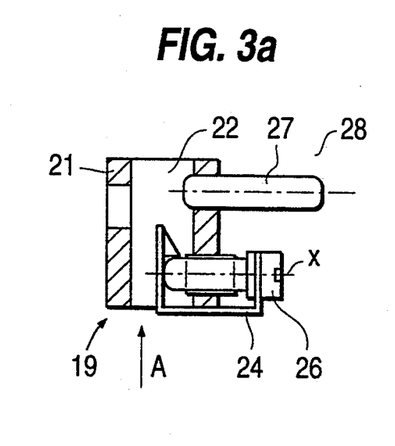
FIGS. 3a and 3b are cross sectional views of a clamp of the motor connection of the motor connection block of FIG. 2.
Figure 3B:
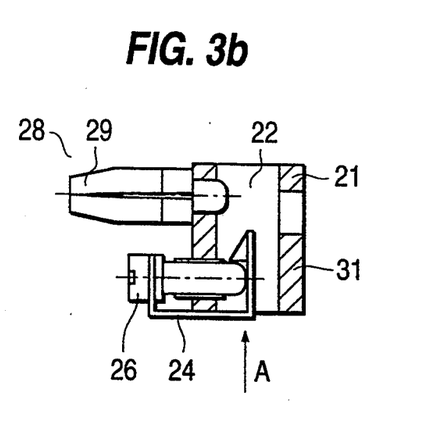

As shown in FIGS. 3a and 3b, set screws 26 provided with a clamp stirrup or frame 24 are located in the sleeves 21 perpendicular to the insertion direction A, B (FIGS. 2, 3). Parallel to the axis X (FIG. 3a) of the setscrews 26 connecting pins 27 extend from the sleeves 21 of the clamps 19 and together with connecting bushes 29 on the clamps 31 which are adapted thereto form a plug contact 28. The clamps 31 also have insertion sleeves 21 for the cable strands corresponding to the sleeves 21 and setscrews 26 with clamp stirrups or frame 24 positioned parallel and alongside connecting bushes 29.

The clamps 31 are located in the socket insert 12, which also comprises a fastening plate 32 and profile walls 33, 34 extending perpendicular to the main surface thereof. The profile walls 33 surround the clamps 31 and are constructed in such a way that they can be inserted in the recesses 18 of the plug insert 11 surrounding the clamps 19, so that the clamps 19, 31 and the plug contacts formed by their pins 27 and bushes 29 are entirely surrounded by insulating casing material. The wall 34 is adapted to the shape of the block 17 of the plug insert 11 in such a way that on assembling the plug insert 11 and the socket insert 12 the wall 34 surrounds the block 17. The interior of the sleeves 22 of the clamp 31 is accessible in the socket insert 12 through lateral insertion slots 36 corresponding to the insertion slots 23 and by means of which the cable strands can be inserted into the clamps 31 in insertion directions A, B. The fastening plates 16, 33 have fastening holes 37 enabling the plug inserts 11 to be fixed to the intermediate plate or the stator flange 6 and the socket insert 12 to the inside of the upper wall of the motor terminal box cover 7.

The plug insert 11 of the motor connection block has on the end faces of the block part 17 incisions 41 extending perpendicular from the fastening plate 16 and in which are located earth bars 42. In the same way the socket insert 12 has earth bars 43, which on assembling the plug insert 11 and the socket insert 12 immediately come into contact. Whereas the pins 27 and associated bushes 28 only extend over part of the height of the block part 17 or the walls 33, 34, the earth bars 42, 43 extend over the entire height of the block part 17 or the walls 33, 34, so that the contact of the earth bars 42, 43 is produced on assembling the plug and socket inserts 11, 12, whereas the contacting via the pins 27 and bushes 29 only takes place during the further engagement of the socket insert 12 on the plug insert 11. In the same way, the contact rails are only disengaged following the separation of all the plug contacts 27, 29. The earth bars 42, 43 are so electrically connected by means of the screw fastenings provided through the openings 37, that on fixing the motor connection block to the stator flange or the terminal box cover there is simultaneously an earthing or grounding thereof.

The recesses 18 with the clamps constructed therein, as well as the walls 33 with the clamps surrounded by the latter are so asymmetrically arranged in the plug insert 11 or the socket insert 12, that an incorrect assembly of the two parts 11, 12 is prevented. For this purpose individual clamps 51, 52 are constructed without plug contacts 27, 29 in the embodiment shown.

The plug contacts 19 of the plug insert 11 are connected to the corresponding terminals of motor windings U1, U2, V1, V2, W1, W2, whereas the corresponding clamps 31 of the socket insert 12 connected by means of the plug contacts 27, 28, 29 to the windings U1, V1, W1 on assembling the plug and socket inserts 11, 12 are connected to the individual conductors L1, L2 or L3 of the power supply. A clamp pair (RES) is provided in reserve. By means of the clamp pairs of the other clamp pair series or row of the motor connection block, further connections can be made, such as e.g. the wiring of the terminals BL, R, BS of the brake of the electric motor 4 via corresponding clamps of the plug insert 11 with the control device housed in the cover 7 (e.g. rectifiers) for the motor brake (terminal 1, 3, 5). Furthermore, by means of terminals or connections of the socket insert 12 held in the casing cover it is possible to wire an electronic switch for the rapid unlocking of the motor brake. It is also possible to interchange the plug and socket inserts.

It is finally also possible to carry out the connection of the motor in star or delta arrangement by means of terminal bridges, optionally in the form of interchangeable terminal bridges. The contact pins of the terminal bridges together with the corresponding cable strands are inserted through insertion slots 23 into the cavity 22 of the clamp sleeves 21 of the clamp 19 of the plug insert 11 and fixed by means of setscrews 26 together with the inserted cable strands.

Figure 4A:
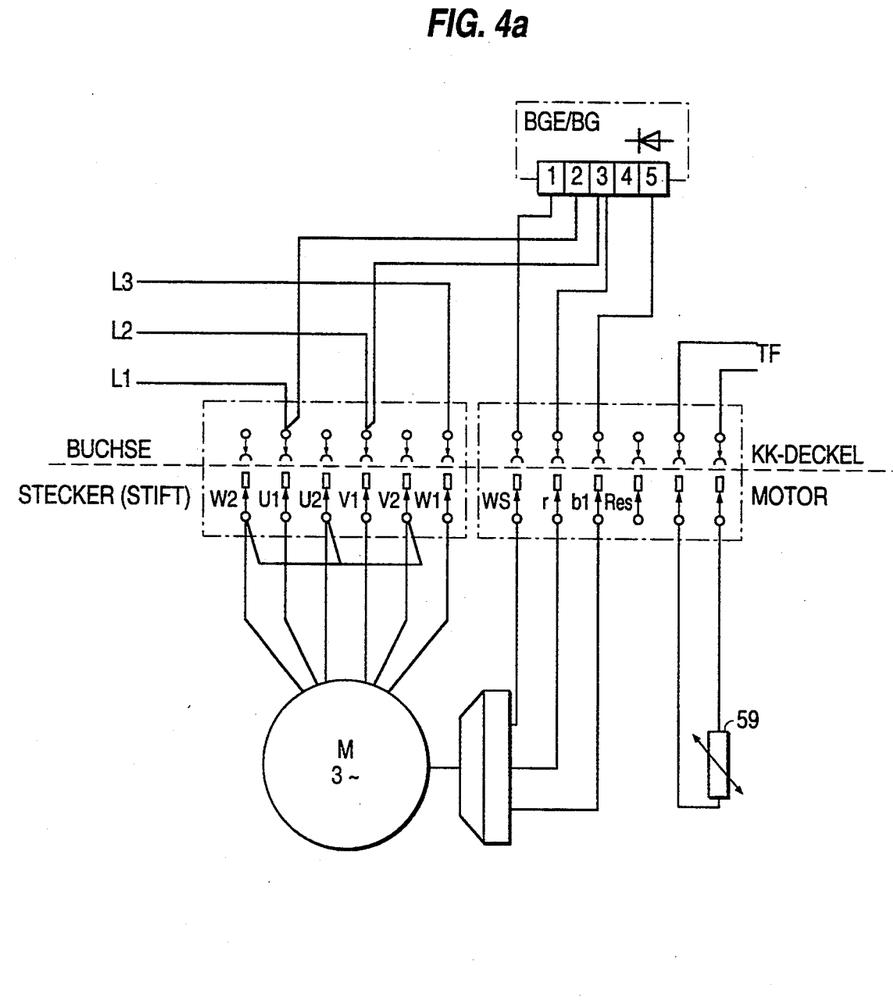
FIGS. 4a–4e Circuit diagrams of different circuits obtainable with the motor connection block according to the invention.
Figure 4B:
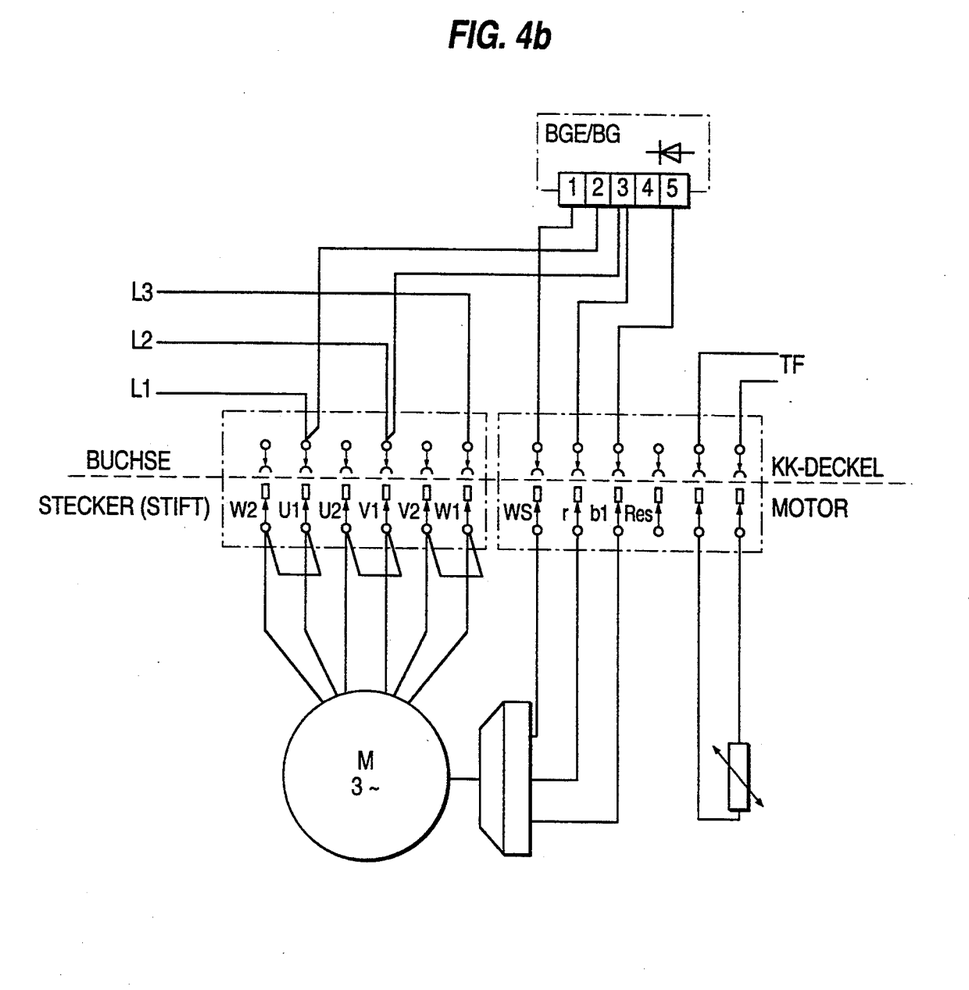
Figure 4C:
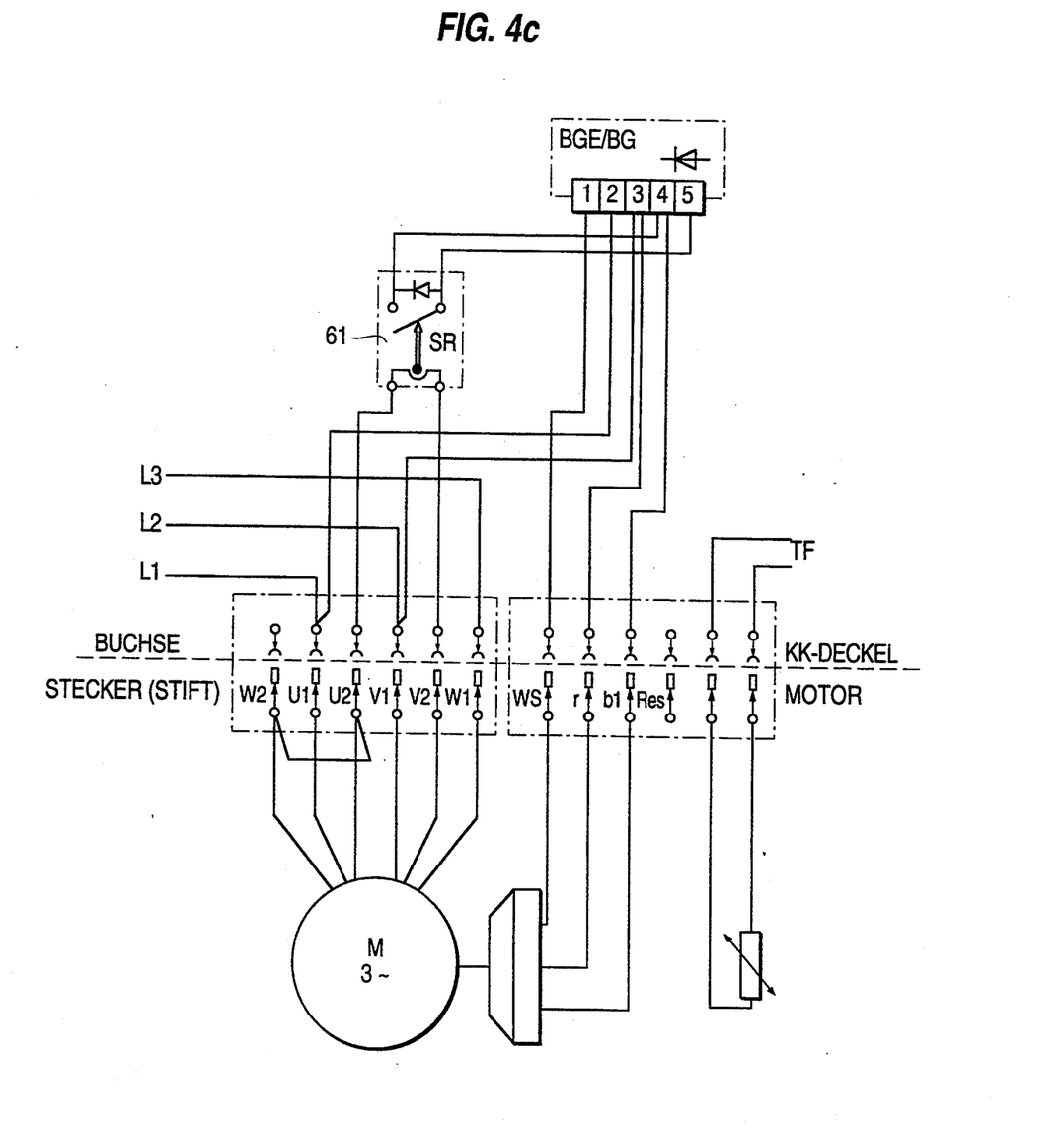
Figure 4D:
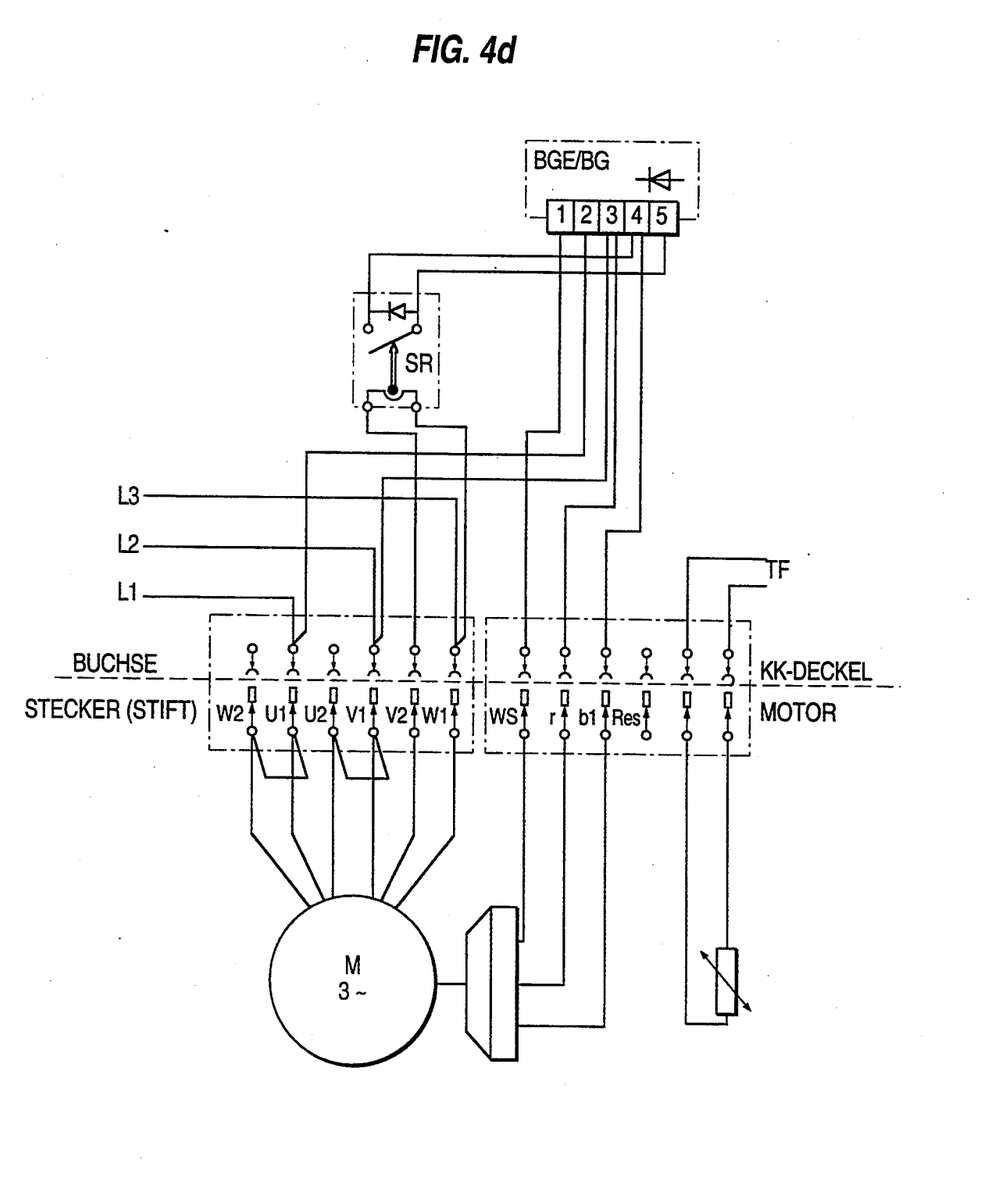
Figure 4E:
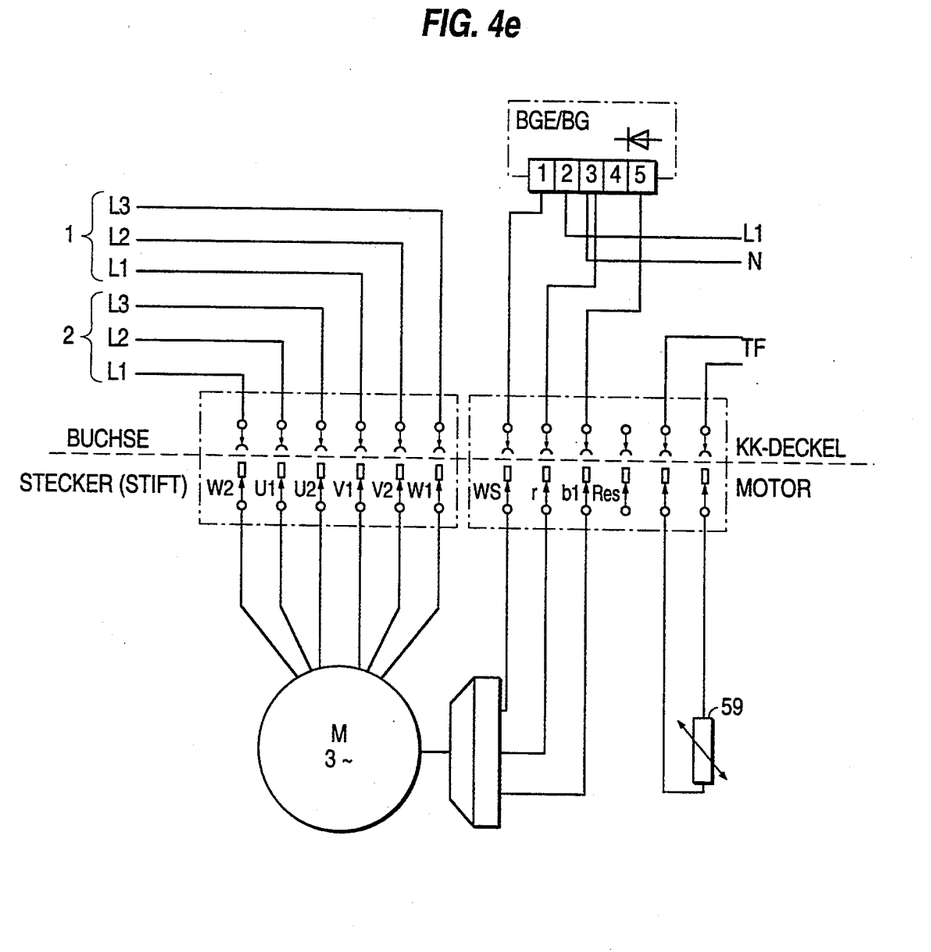

Thus, by means of the motor connection block according to the invention, in simple manner the circuit arrangement shown in FIGS. 4a to 4e can be obtained. The circuit 4a is a motor in star connection with a brake and temperature sensor 59, whose wiring also takes place in corresponding manner by means of the motor terminal block. The circuit of FIG. 4b shows a corresponding motor with a delta connection. The circuit of FIG. 4c shows a motor with a star connection and additionally with an electronic rapid disconnection means 61. FIG. 4d shows a motor in a corresponding delta connection. FIG. 4e shows a polechangeable motor with a separate winding and separate brake supply voltage, the latter being provided in the case of FIGS. 4a to 4d by the motor line voltage.

We claim:

1. Motor connection block with a plug insert and a socket insert, wherein the plug insert is constructionally integrated into a motor terminal box and the socket insert constructionally positioned in the terminal box cover such that the motor terminal box forms a plug casing and the terminal box cover forms a casing for the socket insert and serves as a carrier for at least one cable screw joints, said plug insert and said socket insert respectively include clamps with the socket insert including connecting bushes, each plug insert includes a connecting pin, with the connecting pin being adapted to be inserted into the connecting bush of the socket insert so as to form a plug contact, and wherein set screws of the clamps in the plug insert and the socket insert are disposed in parallel to the connection pin and the connecting bushes, and a screw head of the set screws is directed in a plug-in direction of the plug contact.

2. Motor connection block according to claim 1, wherein earth bars extend parallel to the connecting pins, and wherein a length of the earth bars is greater than a length of the connecting pins.

3. Motor connection block according to claim 1, wherein cable strands are insertable into insertion slots of pairwise connectable clamps laterally to a plug-in direction of the plug insert and socket insert.

4. Motor connection block according to claim 1, wherein the respective clamps include insertion slots for accommodating cable strands interconnectable clamps are disposed in parallel to one another land in the same direction.

5. Motor connection block according to claim 1, wherein two rows of pairwise interconnectable clamps are provided.

6. Motor connection block according to claim 1, wherein the plug insert and the socket insert are constructed in a complimentary asymmetrical manner.

7. Motor connection block according to claim 1, wherein the connecting pins and the set screws are surrounded by plastic profiled elements.

8. Motor connection block according to claim 2, wherein the earth bars are electrically conductively connected with fastening screws of the plug insert and the socket insert.

* * * * *